United States Patent
McCaffrey et al.

(10) Patent No.: US 9,311,626 B2
(45) Date of Patent: Apr. 12, 2016

(54) ELECTRONIC MAIL REPLY WITH UPDATE

(75) Inventors: Corey S. McCaffrey, Boston, MA (US); Fang Lu, Billerica, MA (US); Elaine I. Kuo, Chelmsford, MA (US); Kimilee S. Gile, Leominster, MA (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 12/188,156

(22) Filed: Aug. 7, 2008

(65) Prior Publication Data

US 2010/0036917 A1  Feb. 11, 2010

(51) Int. Cl.
 G06F 15/16 (2006.01)
 *G06Q 10/10* (2012.01)
 H04L 12/58 (2006.01)

(52) U.S. Cl.
 CPC .............. *G06Q 10/107* (2013.01); *G06Q 10/10* (2013.01); *H04L 51/18* (2013.01)

(58) Field of Classification Search
 USPC .......................................................... 709/206
 See application file for complete search history.

(56) References Cited

U.S. PATENT DOCUMENTS

| | | | |
|---|---|---|---|
| 6,169,988 B1 | 1/2001 | Asakura | |
| 6,757,723 B1 | 6/2004 | O'Toole et al. | |
| 6,996,583 B2 | 2/2006 | Wilmot | |
| 7,269,621 B2 | 9/2007 | Chang et al. | |
| 7,437,421 B2 * | 10/2008 | Bhogal et al. | 709/206 |
| 7,539,763 B2 * | 5/2009 | Toyota et al. | 709/229 |
| 7,673,006 B2 * | 3/2010 | Bhogal et al. | 709/206 |
| 7,698,171 B2 * | 4/2010 | Rampell et al. | 705/26.3 |
| 2003/0009365 A1 * | 1/2003 | Tynan et al. | 705/9 |
| 2005/0033811 A1 * | 2/2005 | Bhogal et al. | 709/206 |
| 2005/0198158 A1 * | 9/2005 | Fabre et al. | 709/206 |
| 2005/0246423 A1 * | 11/2005 | Starbuck et al. | 709/206 |
| 2006/0106889 A1 * | 5/2006 | Mannby | 707/203 |
| 2006/0161585 A1 * | 7/2006 | Clarke et al. | 707/104.1 |
| 2006/0161631 A1 * | 7/2006 | Lira | 709/206 |
| 2007/0005714 A1 * | 1/2007 | LeVasseur et al. | 709/206 |
| 2007/0124400 A1 * | 5/2007 | Lee | 709/206 |
| 2007/0143425 A1 * | 6/2007 | Kieselbach et al. | 709/206 |
| 2009/0083384 A1 * | 3/2009 | Bhogal et al. | 709/206 |
| 2009/0210506 A1 * | 8/2009 | Brown et al. | 709/206 |

OTHER PUBLICATIONS

Dabbish et al., Understanding Email Use: Predicting Action on a Message, CHI 2005, Apr. 2-7, 2005, Portland, Oregon, USA, pp. 691-700, ACM Digital Library.

(Continued)

*Primary Examiner* — Hamza Algibhah
*Assistant Examiner* — James Edwards
(74) *Attorney, Agent, or Firm* — BainwoodHuang

(57) ABSTRACT

When a user reading a received e-mail message selects a reply with revisions option, a user interface object is generated that allows the user to directly revise the contents of the received e-mail message, and to provide a reason for the revision. The resulting reply message is a revision of the original message, and is transmitted to original sender and all other recipients of the original message, with indications of how and by whom the original message was revised. When multiple revisions of a message are received, the multiple revisions are automatically merged into a single user interface object such that all the revisions can be read simultaneously by the receiving user. The user viewing the merged revisions can select a show revision details user interface option that causes the details of the merged revisions to be displayed.

12 Claims, 9 Drawing Sheets

(56) References Cited

OTHER PUBLICATIONS

Whittaker et al., Email in Personal Information Management, Communications of the ACM, Jan. 2006, pp. 68-73, ACM Digital Library.

Kushmerick et al., Automated Email Activity Management: An Unsupervised Learning Approach, IUI '05, Jan. 9-12, 2005, San Diego, California, USA, pp. 67-74.

* cited by examiner

ELECTRONIC MAIL REPLY WITH UPDATE

FIELD OF THE INVENTION

The present invention relates generally to electronic mail systems, and more specifically to an electronic mail system including a reply with update feature.

BACKGROUND OF THE INVENTION

As it is generally known, electronic mail (also referred to as "e-mail" or "email") is a store-and-forward method of writing, sending, receiving and saving messages over electronic communication systems. Examples of e-mail include the Internet e-mail system based on the Simple Mail Transfer Protocol (SMTP), and systems based on other protocols, including intranet systems allowing users to share messages in support of workgroup collaboration.

E-mail is a difficult medium to harness for collaborative document editing. For revision tracking, users typically must resort to sending documents as attachments that are written and accessed through a separate word processing application that supports revision tracking. However, working with document attachments can be cumbersome and slow, and prevents use of some of the features provided by the e-mail system, such as the ability to search within the bodies of messages. Furthermore, the extensive functionality of a word processor application or the like is excessive for many typical use cases, such as generating a simple list, e.g. a grocery list or the like.

For example, if two or more users attempt to use an existing e-mail system to maintain a list, they have essentially two choices, neither of which supports revision tracking:

1) Copy and paste the original text from a preceding message into the body of a new, blank message before making changes to the list and sending the modified version to the sender and other recipients. The result is clean and printable, but the time and effort required is burdensome, the process is prone to error, and there is no automated support for revision tracking, merging revisions, and/or handling conflicting revisions.

2) Use the "Reply" feature of the e-mail system. After a few list revisions using this approach, the end result typically becomes difficult to read or understand, sometimes due to artifacts (e.g. leading characters such as ">>" and the like) automatically introduced into the modified message body by the e-mail system. And again there is no automated support for revision tracking, merging revisions, and/or handling conflicting revisions.

For the above reasons and others, it would be desirable to have a new solution that allows users to use e-mail to revise e-mail message content without the need for tedious manual cutting and pasting, and/or the risks associated with parallel manual editing without automated revision tracking and merging of multiple revisions, and/or convenient handling of conflicting revisions.

SUMMARY OF THE INVENTION

To address the above described and other shortcomings of previous approaches, a new method and system are disclosed for a feature in an e-mail system that allows the user to create a revision of a previous message. In the disclosed system, when a user reads a received e-mail message, a user selectable user interface option (e.g. a button, menu item or the like) is provided in the user interface. When the user reading the received e-mail message selects (e.g. clicks on) the option, a user interface object is generated by the disclosed system that allows the user to directly revise the contents of the received e-mail message, and to provide a reason for the revision. The resulting message is a revision of the original message, and is transmitted to the original message sender and all other recipients of the original message. The revision includes information that supports revision tracking, including specific indications of how the original message was revised (e.g. which text was deleted, which text was added, etc.), an indication of the identity (e.g. the name or user name) of the user that created the revision, and one or more comments associated with the revision.

When multiple revisions of a previous message are received, for example by the e-mail client of the original sender or a recipient of the original message, the multiple revisions are automatically merged into a single user interface object such that all the revisions can be read simultaneously by the local user. For example, in one embodiment, if multiple revisions of a previously sent or received message are received by the e-mail client of a local user of a client system, and the user then selects (e.g. clicks on) a representation of one of the received revisions (e.g. a received message indication displayed in the user's e-mail in-box or the like), the disclosed system automatically merges all the received revisions of the original message for display a single user interface display object that combines all the changes to the original message made in the multiple received revisions. The user viewing the merged revisions can then select a user interface option that causes the details of the merged revisions to be displayed, such as indications of which lines of text were added, which lines of text were deleted, which users made which specific addition or deletion, etc.

In one embodiment, the disclosed system further operates to detect when revisions conflict, e.g. when changes made to the same original message by different users conflict such that the revisions cannot be automatically merged. In the event of such a conflict, this embodiment of the disclosed system operates to display the complete set of conflicting changes to the user that authored one of (e.g. the later) the conflicting revisions, and gives that user an opportunity to perform manual edits to the conflicting changes, and to make further comments. The manually entered changes and additional comments are then sent out as another revision of the original message.

The disclosed system may be embodied by providing a revision merging component in the e-mail client within the client computer system. In such an embodiment, the disclosed system operates such that when two or more people are using e-mail clients that include the revision merging component, those users can use the features of the disclosed system transparently with regard to the underlying e-mail servers.

Thus there is provided a new system that allows e-mail users to collaboratively revise e-mail message body content without a need for tedious manual cutting and pasting, and/or the risks associated with manual editing of message body content performed without automated revision tracking and/or merging of multiple revisions.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
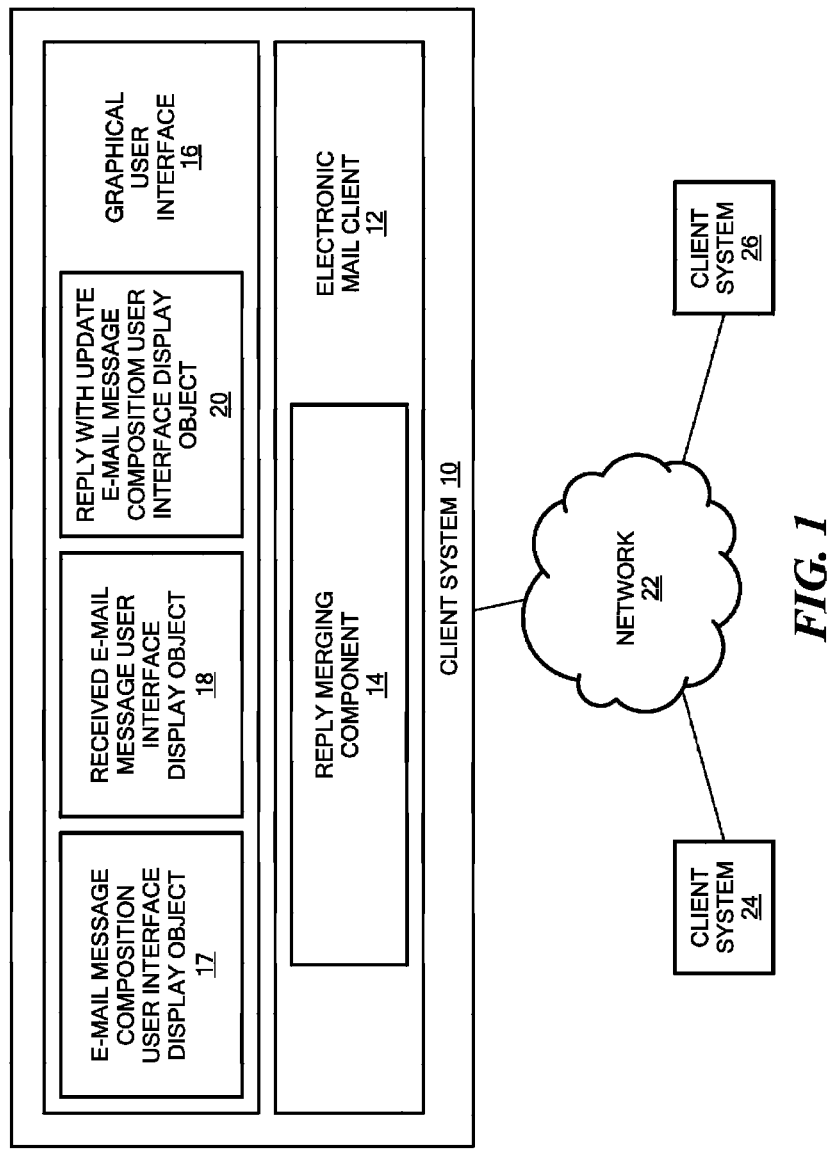
FIG. 1 is a block diagram showing hardware and/or software components in an illustrative embodiment of the disclosed system.

FIG. 1 is a block diagram showing hardware and/or software components in an illustrative embodiment of the disclosed system. As shown in FIG. 1, a Client System 10 includes an Electronic Mail Client 12 having a Reply Merging Component 14. The Electronic Mail Client 12 operates to generate the Graphical User Interface 16, which includes an E-Mail Message Composition User Interface Display Object 17, a Received E-Mail Message User Interface Display Object 18 and a Reply With Update E-Mail Message Composition User Interface Display Object 20.

The Client System 10 is communicably connected to other systems through a Network 22, including for example a Client System 24 and a Client System 26. Each of the Client Systems 24 and 26 also include an electronic mail client such as the Electronic Mail Client 12, generating a graphical user interface such as the Graphical User Interface 16 of Client System 10.

During operation of the components shown in FIG. 1, the illustrative embodiment provides a user of the Client System 10 with the ability to compose and send an e-mail message to multiple recipients through the E-Mail Message Composition User Interface Display Object 17. The message recipients open and read the e-mail message using the Received E-Mail Message User Interface Display Object 18. A user selectable "Reply with Updates" user interface option is provided as part of the Received E-Mail Message User Interface Display Object 18. In response to detecting user selection of the "Reply with Updates" user interface option, the disclosed system generates the Reply With Update E-Mail Message Composition User Interface Object 20. The Reply With Update E-Mail Message Composition User Interface Object 20 enables the user to compose a response message (a "revision") that is a revised version of the contents (e.g. text) of the body of the original e-mail message. For example, when the user selects the "Reply with Updates" user interface option, the contents of the message body of the received message are automatically loaded into a message composition area of the Reply With Update E-Mail Message Composition User Interface Object 20, in which the user is able to edit the body of the received message to create a revised version of the body of the received message, for example using text editing actions such as deleting and adding text, etc.

The disclosed system further operates to record details describing how changes were made to the original message body to create a revision, such as indications of which specific text was deleted, which specific text was added, etc., so that such details of how the original message was changed by a revision author can be sent along with the resulting revision message. In addition, the disclosed system allows the revision author to enter one or more comments that are also sent along with the resulting revision message. The identity of the revision author is also recorded and sent with the resulting revision message.

When revisions generated using the Reply With Update E-Mail Message Composition User Interface Object 20 are received, the disclosed system operates to merge them, for example through operation of a reply merging component of the receiving electronic mail client such as the Reply Merging Component 14. For example, in one embodiment, when a user requests access to a message (e.g. through the Received E-Mail Message User Interface Display Object 18), the disclosed system first determines whether the received message is a revision of a previous message. If so, the disclosed system collects all other revisions to the previous message that have been received, and automatically merges all the received revisions together to create a simultaneous display of all the changes contained in all the received revisions in a single user interface display object (e.g. within a single message body window or the like within the Received E-Mail Message User Interface Object 18). The user is also provided with a user selectable user interface option (e.g. "Show Changes", "Show Details", or the like) that provides access to detailed information showing individual changes (e.g. indications of individual text additions, deletions, etc.) is displayed within the merged revisions. Such revision detail information may, for example, include visual indications (e.g. associated colors, names and arrows, etc.) of which user made each individual change, the time each revision was made, etc. The Received E-Mail Message User Interface Object 18 may further display the contents of one or more of the comments received with the revisions that were merged together in this way. The merged revisions may also be automatically assigned a new revision number, e.g. when they are read by the receiving user.

Other aspects of the operation of the components shown in the illustrative embodiment of FIG. 1 and other embodiments of the disclosed system are described below.

The Client Systems 10, 24 and 26 of FIG. 1 may be any specific type of computer systems and/or intelligent electronic devices, such as a desktop, laptop, or palmtop computer systems, and/or personal digital assistants, cell phones, or other electronic devices. The Client Systems 10, 24 and 26 include or control display devices capable of displaying a graphical user interface (e.g. including Graphical User Interface 16) to a respective local user, such as a liquid crystal display (LCD), cathode ray tube (CRT), interferometric modulator display (IMOD), light emitting diode (LED), or the like.

Those skilled in the art will further recognize that the Electronic Mail Client 12 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the Client Systems 10, 24 and 26 of FIG. 1 may each include one or more processors, and program storage, such as memory, for storing program code executable on such processors, as well as input/output devices and/or interfaces. In the example of FIG. 1, the Client Systems 12, 24 and 26 are interconnected by a data communication network (e.g. the Internet, a Local Area Network, etc.) through one or more of such input/output devices or interfaces, and through which may further be provided communication to a number of other client systems and/or remote server systems.

While for purposes of concise illustration a limited number of client systems are shown in FIG. 1, the disclosed system is not limited to any specific number of client or server systems.

Figure 2:
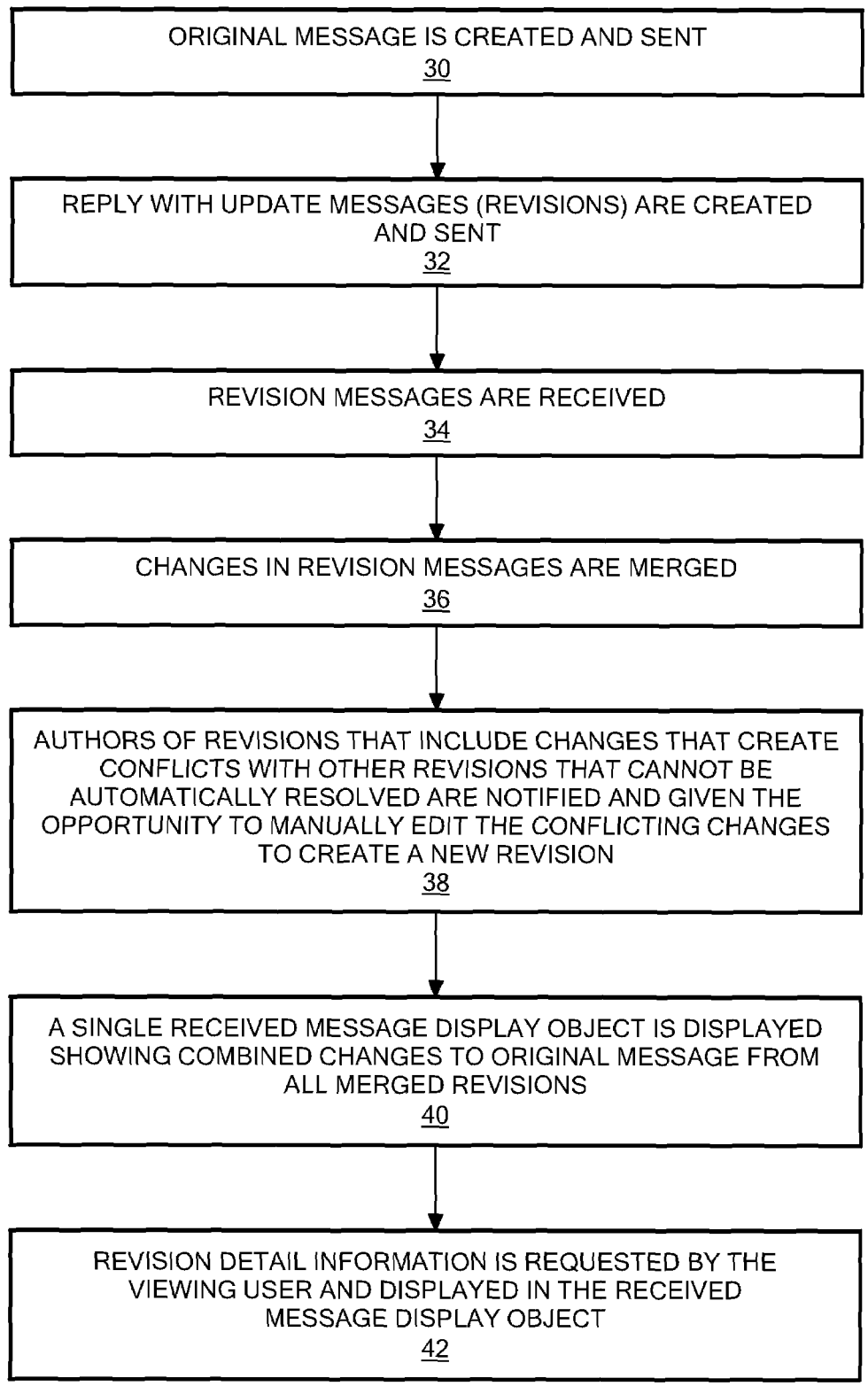
FIG. 2 is a flow chart showing steps performed during operation of an illustrative embodiment of the disclosed system.

FIG. 2 is a flow chart showing steps performed during operation of an illustrative embodiment of the disclosed system. As shown in FIG. 2, at step 30 an original e-mail message is created and sent by a first user to one or more recipients (e.g. using E-Mail Message Composition User Interface Object 17). The original e-mail message created at step 30 is received by the message recipients, and one or more revisions of the original message are created and sent by the message recipients at step 32. For example, the revision messages are created and sent at step 32 by recipients of the original message selecting a reply with update user interface option (e.g. button, menu item etc. in the Received E-Mail Message User Interface Object 18), and then performing editing operations on the original message body (e.g. adding text, deleting text, etc.) that is automatically loaded into a revision authoring user interface object (e.g. a message composition window or the like within the Reply With Update E-Mail Message Composition User Interface Object 20). The creation of the revision messages at step 32 includes storing the actions performed to make specific changes made to the original message (e.g. text deletions, additions, etc.) into each revision message for future access and display. The creation of the revision messages at step 32 further includes providing each author of a revision message a text entry field into which they can enter a comment or explanation that is also stored in the revision message. The identity of each revision author is also stored in the respective revision message. Each revision of the original message may be assigned the next of a sequential series of revision numbers, such that later revisions are assigned larger revision numbers than earlier revisions. The revision messages created at step 32 are transmitted to the sender and all other recipients of the original message created and sent in step 30.

The revision messages created and sent at step 32 are received at the respective client systems at step 34. At step 36, the revision messages received at step 34 are merged such that all the changes made to the original message in revisions created at step 32 can be simultaneously displayed in a single user interface display object. For example, when a recipient of one or more of the revisions opens that revision, the disclosed system collects all other revisions to the original message that have also been received (e.g. are currently contained within the recipients e-mail in-box). The disclosed system then merges all the changes in all the received revisions to the original message into a new revision for viewing by the local user within a single user interface display object. Alternatively, received revisions of an original message may be automatically merged together as they are each received into a user's in-box or the like.

At step 38, the disclosed system determines whether the changes in a revision can or cannot be automatically merged with changes from another (e.g. previous) revision. For example, in one embodiment, changes that are deletions or additions of complete lines of text or list items are considered automatically mergable. In contrast, changes that are deletions or additions of one or more words or characters within the same line or list item that is also modified in a previous revision by a different deletion or addition of one or more words or characters is considered to not be automatically mergable with the previous revision. When a revision author has made a change that is not automatically mergable with a previous revision, the disclosed system notifies that user, e.g. through a separate message, pop up window, etc., and provides him or her with the ability to manually edit the two sets of conflicting changes in a way that creates a single new revision. However, a change made to an individual line and/or list entry is determined to be automatically mergable with changes made in other revisions so long as the line and/or list entry is not also modified (i.e. changed or deleted) in any change made in such other revisions.

Accordingly, in one embodiment, if two different users make changes to the same line of the e-mail message, then the disclosed system determines that the two revisions cannot be automatically merged. For example, if a list within an original e-mail message body includes the line "1 dozen eggs", and then a first recipient of the message replies and changes that line to "2 dozen eggs", while at the same time a second recipient of the message replies and changes the line to "3 dozen eggs," the disclosed system operates to determine that the two revisions cannot be automatically merged, and provides a message editing interface/window or the like in which one of the two recipients (e.g. the later replying recipient) can view the conflicting edits and manually edit the message line to create another revision while considering the specific conflicts between the changes. In another example, an original message includes a list with an entry indicating "10 pencils," and a first recipient responds by creating a revision in which the entry is modified to "5 pencils," while simultaneously a second recipient responds by creating a revision in which the entry is modified to "20 pencils," causing the disclosed system to automatically determine that the two revisions cannot be automatically merged. The preceding examples are only for purposes of explanation, and conflicts between changes may be determined by the disclosed system for any specific type of list entry and/or line of text in the body of an e-mail message.

Alternatively, the disclosed system may be configured or embodied to operate upon determination of a conflict between changes by automatically selecting one of the conflicting changes and over-riding the other conflicting changes. For example, one of the conflicting changes could be automatically selected in response to a determination that it is the most recent of the conflicting changes, or in response to a determination that it is the first of the conflicting changes, or in response to another type of automatic change prioritization.

In another alternative configuration or embodiment, the conflicting changes are all displayed to a later recipient of one of the revision messages containing one of the conflicting changes, and the recipient is allowed to manually select which of the conflicting changes is to be given priority over the other conflicting changes.

At step 40, the disclosed system displays a single received message display object showing changes to the original message from all merged revisions in a single window. At step 42, the disclosed system determines that the user has selected a user selectable option in the user interface (e.g. a button, menu item, etc.) that causes the disclosed system to display revision detail information in the received message display object regarding specific changes. For example, such detail information may indicate the specific changes that were made to the original e-mail message (e.g. using strike through to show deleted text, underlines or bold to show added text, etc.), and/or which users made which specific changes (e.g. using colors uniquely associated with individual revision authors, etc.), and/or a revision number associated with each change to indicate which revision a change was made in and the order in which the changes were made.

Figure 3:
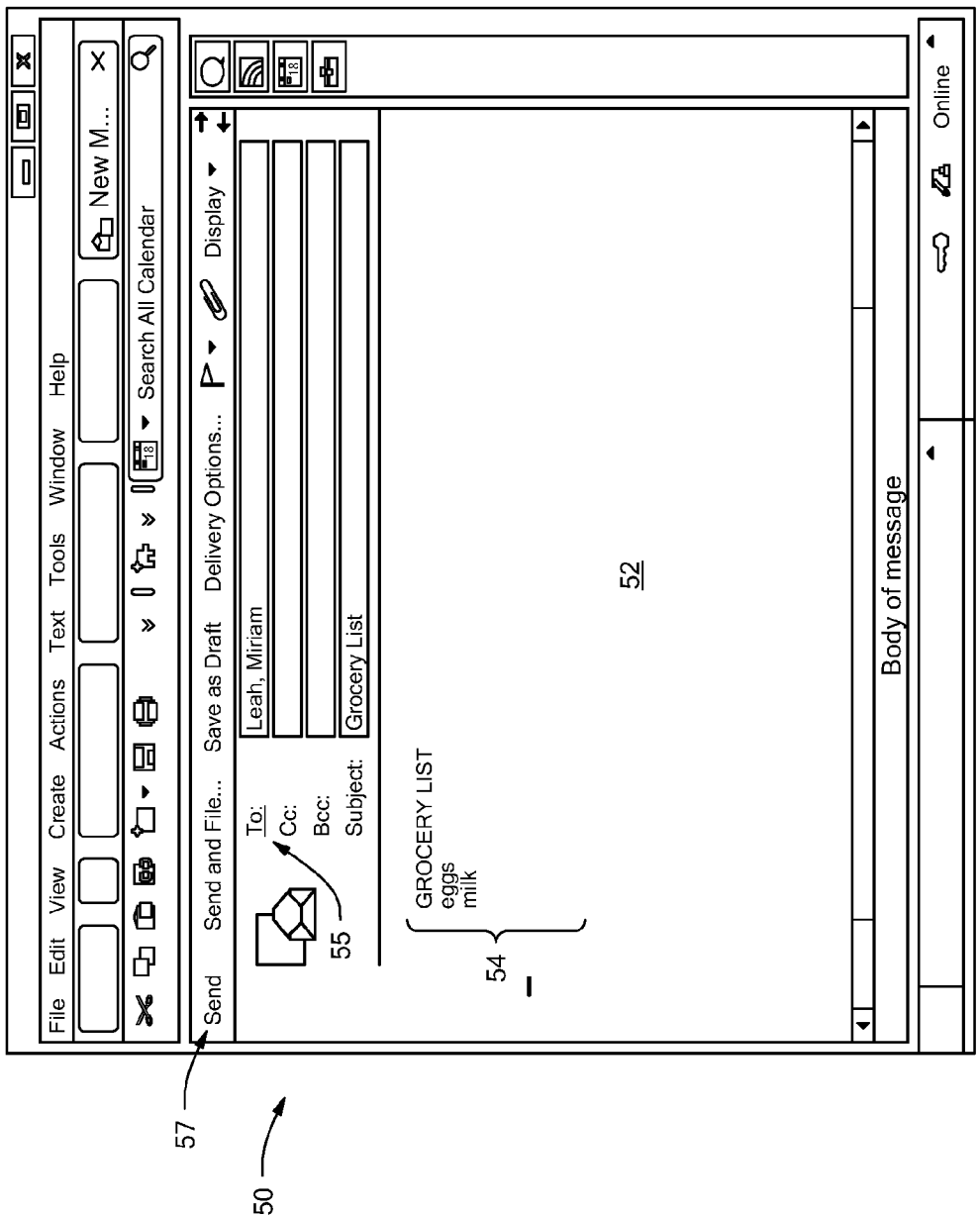
FIG. 3 is a simplified screen shot showing a first example of an e-mail message composition user interface display object generated during operation of an illustrative embodiment of the disclosed system.

FIG. 3 is a simplified screen shot showing an example of an E-Mail Message Composition User Interface Object 50 generated during operation of an illustrative embodiment of the disclosed system. The E-Mail Message Composition User Interface Object 50 is an example of the E-Mail Message Composition User Interface Object 17 of FIG. 1. The E-Mail Message Composition User Interface Object 17 is shown including a Message Composition Area 52 in which an original message author ("Sarah") has entered Message Content 54, shown for purposes of explanation as a grocery list. The message author clicks on the Send button 57 to send the completed message to the message recipients indicated in the To: field 55 ("Leah" and "Miriam").

Figure 4:
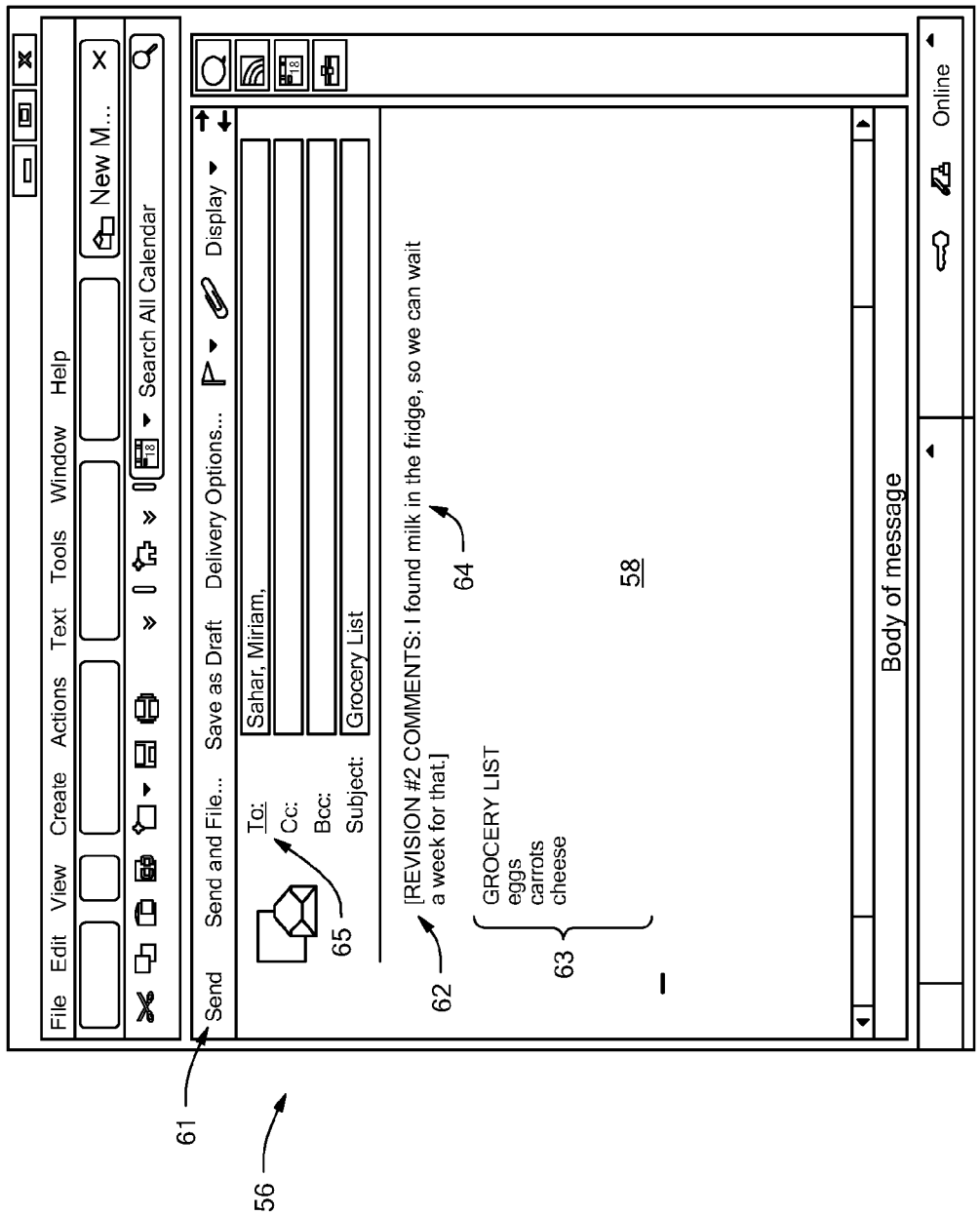
FIG. 4 is a simplified screen shot showing a first example of a reply with update e-mail message composition user interface display object generated during operation of an illustrative embodiment of the disclosed system.

FIG. 4 is a simplified screen shot showing an example of a Reply With Update E-Mail Message Composition User Interface Object 56 generated during operation of an illustrative embodiment of the disclosed system. The Reply With Update E-Mail Message Composition User Interface Object 56 is an example of the Reply With Update E-Mail Message Composition User Interface Object 20 of FIG. 1. In the example of FIG. 4, the Reply With Update E-Mail Message Composition User Interface Object 56 is generated when a recipient (e.g. "Leah") of the original message shown in FIG. 3 selects (e.g. clicks on) a "Reply with Update" user interface option. The disclosed system automatically loads the contents of the original message body into the Message Editing Area 58 of the Reply With Update E-Mail Message Composition User Interface Object 56, allows the recipient to revise the original message, e.g. by directly adding or deleting text, and to enter a Comment 64 (e.g. "I found milk in the fridge, so we can wait a week for that") into a field 62 that will be associated with the specific revision (e.g. "REVISION #2") of the original message. In the example of FIG. 4, Leah has revised the contents of the original message by deleting the list entry "Milk" in the Message Editing Area 58, resulting in the Revised Message Content 63. When Leah clicks on the Send button 61 the resulting revision message is sent to the author (Sarah) and all other recipients of the original message (Miriam). The revision message includes both the Revised Message Content 63, the comment 64, the number of the revision (#2), and indications of the specific changes that were made to the original message (Leah deleted the list entry "milk" and added list entries for "carrots" and "cheese"), as well as the identity of the author of the revision (Leah).

Figure 5:
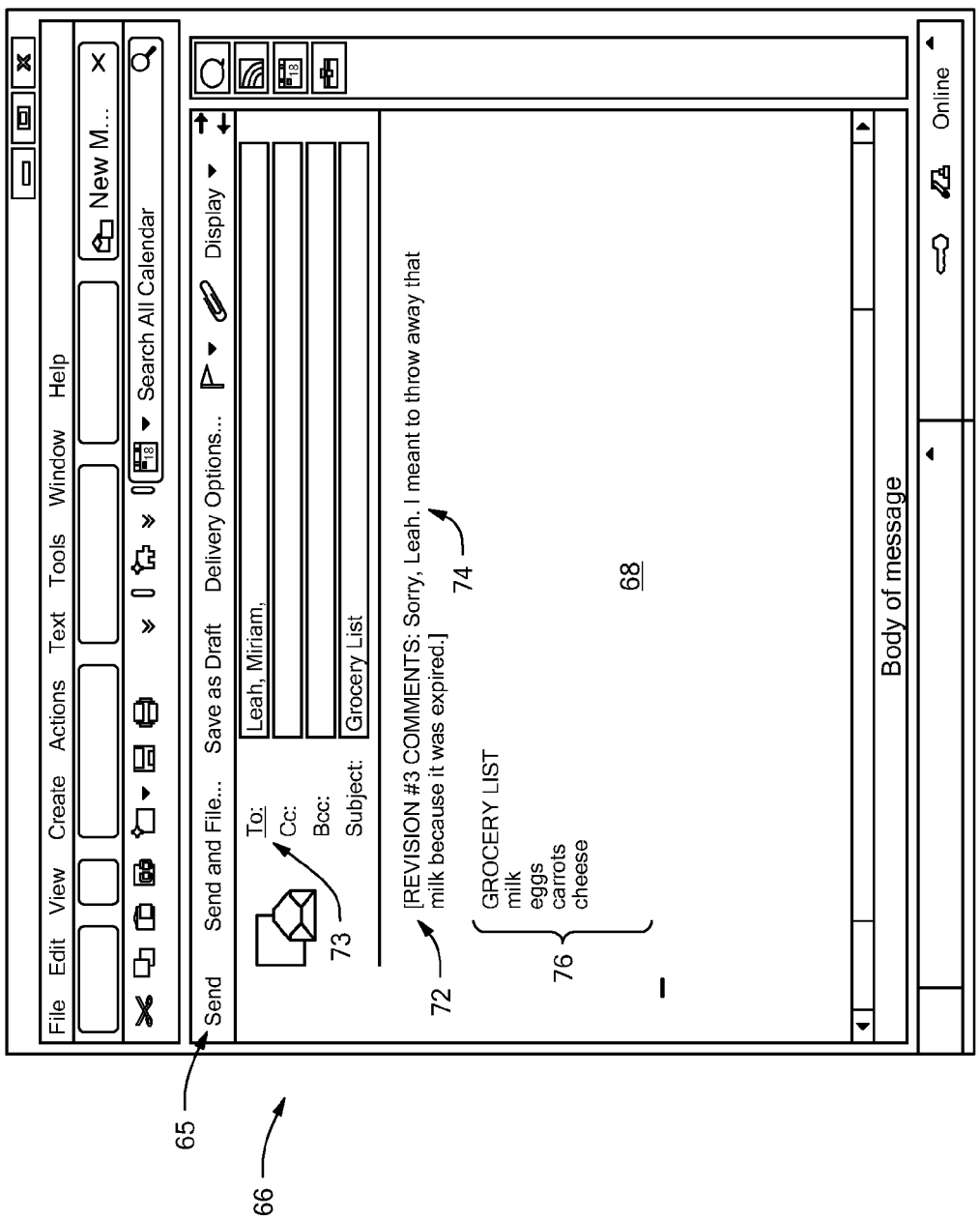
FIG. 5 is a simplified screen shot showing a second example of a reply with update e-mail message composition user interface display object generated during operation of an illustrative embodiment of the disclosed system.

FIG. 5 is a simplified screen shot showing a second example of a Reply With Update E-mail Message Composition User Interface Object 66 generated during operation of an illustrative embodiment of the disclosed system (another example of the Reply With Update E-Mail Message Composition User Interface Object 20 of FIG. 1). In the example of FIG. 5, the author of the original message (Sarah) has received revision #2 created and sent by Leah, and is creating revision #3 by editing the contents of revision #2. Accordingly, Sarah has edited the contents of revision #2 to create the Revised Message Content 76 by add the list element "milk" back into the list. The Message Editing Area 68 is shown including a field 72 into which Sarah has entered the Comment 74 ("Sorry, Leah. I meant to throw away that milk because it was expired.") When Sarah clicks on the Send button 65 the resulting revision message is sent to the recipients of the original message (Leah and Miriam, as indicated in the To: field 73), including both the Revised Message Content 76, the Comment 74, the number of the revision (#3), and indications of the specific changes that were made to the original message (Sarah added the list entry "milk" back into the list) and the author of the revision (Sarah).

Figure 6:
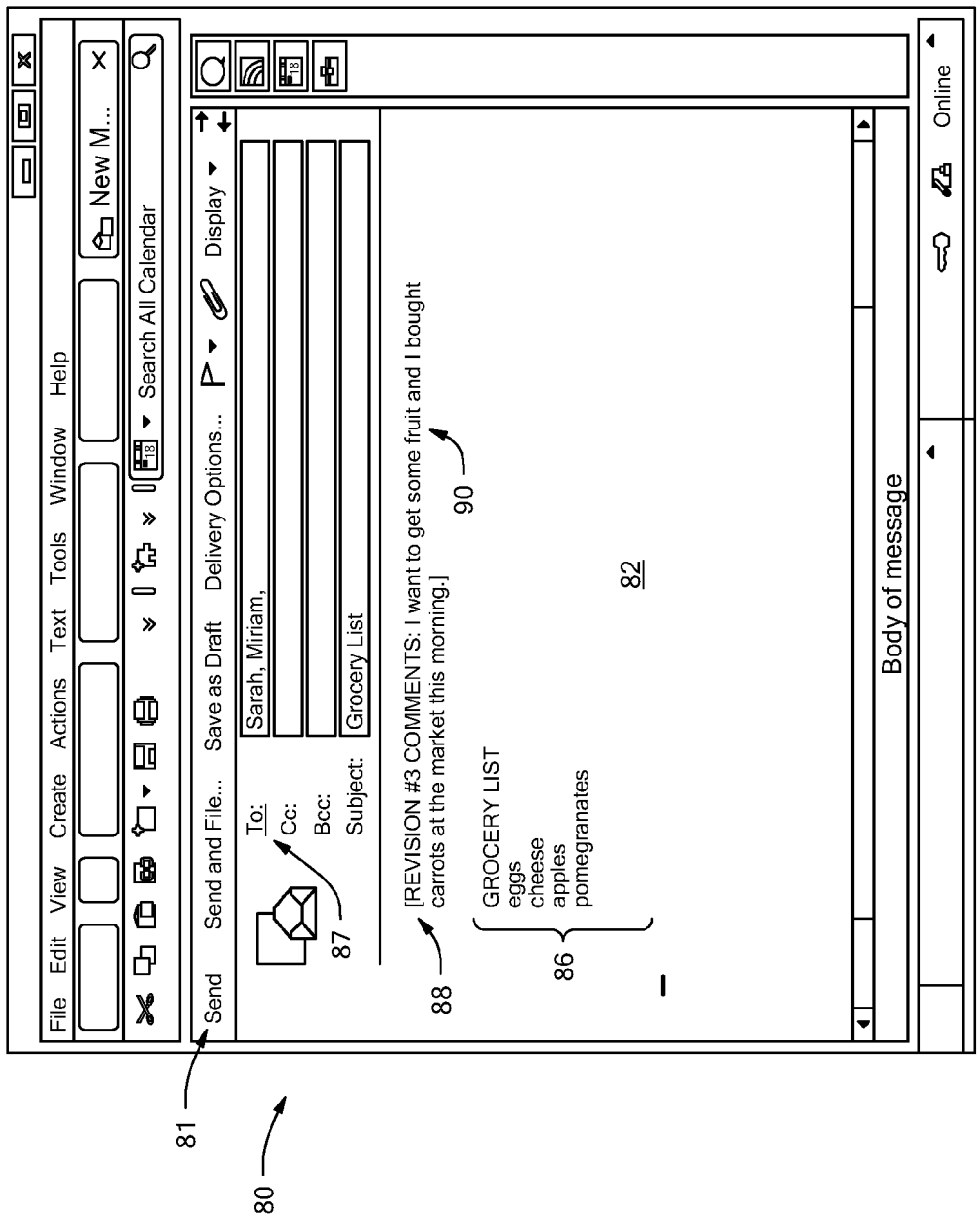
FIG. 6 is a simplified screen shot showing a third example of a reply with update e-mail message composition user interface display object generated during operation of an illustrative embodiment of the disclosed system.

FIG. 6 is a simplified screen shot showing a third example of a Reply with Update E-Mail Message Composition User Interface Object 80 generated during operation of an illustrative embodiment of the disclosed system (another example of the Reply With Update E-Mail Message Composition User Interface Object 20 of FIG. 1). In the example of FIG. 6, another recipient of the original message (Miriam) has also received revision #2 created and sent by Leah, and creates another revision #3 by editing the contents of revision #2 received from Leah. For some reason, Miriam has not seen the revision #3 created by Sarah. For example, Sarah may have begun creating revision #3, but not yet completed and sent revision #3 at the time Miriam opens her copy of revision #2 and/or begins creating her revision #3, or for some reason Sarah's revision #3 was not received by Miriam's e-mail client at the time Miriam opens revision #2 and/or begins creating her revision #3. As shown in FIG. 6, Miriam has edited the contents of revision #2 to create the Revised Message Content 86 by adding the list elements "apples" and "pomegranates" into the list, and removing "carrots." The Message Editing Area 82 is further shown including a field 88 into which Miriam has entered the Comment 90 ("I want to get some fruit, and I bought carrots at the market this morning"). When Miriam clicks on the Send button 81 the resulting revision message is sent to the author and other recipients of the original message (Sarah and Leah, as indicated in the To: field 87), including both the Revised Message Content 86, the Comment 90, the number of the revision (#3), and indications of the specific changes that were made to the original message (Miriam deleted "carrots" and added the list entries "apples" and "pomegranates" into the list), as well as the author of the revision (Miriam).

Figure 7:
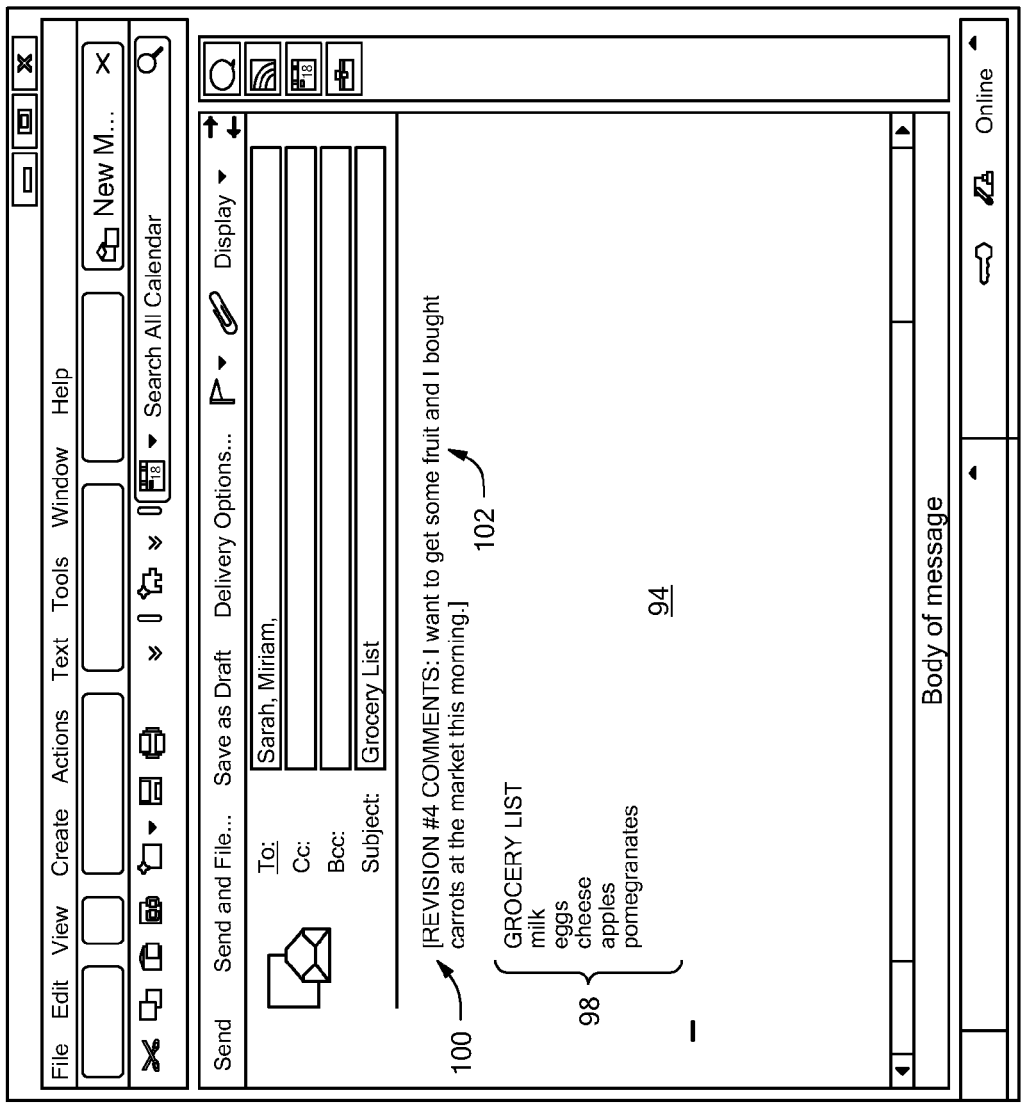
FIG. 7 is a simplified screen shot showing a first example of a received e-mail message user interface display object generated during operation of an illustrative embodiment of the disclosed system.

FIG. 7 is a simplified screen shot showing an example of a Received E-mail Message User Interface Object 92 generated during operation of an illustrative embodiment of the disclosed system (an example of the Received E-mail Message User Interface Object 18 of FIG. 1). In the example of FIG. 7, a recipient of the original message (Leah) has received the revision #3 created and sent by Sarah, and the revision #3 subsequently created and sent by Miriam. When Leah opens the revision #3 from Miriam, the disclosed system operates to merge revision #3 from Sarah and revision #3 from Miriam to create revision #4 that includes all the changes made in both revision #3 from Sarah and revision #3 from Miriam. As shown in FIG. 7, the Merged Revised Message Content 98 in the Message Reading Area 94 has the "milk" entry added back into the list by the revision #3 of Sarah, as well as the "carrots" entry added back into the list by the revision #3 of Miriam, and the "apples" and "pomegranates" entries added to the list by the revision #3 of Miriam. The revision number in the field 100 has been incremented to "#4", and the Comment 102 is the comment from the last received revision ("I want to get some fruit, and I bought carrots at the market this morning").

Figure 8:
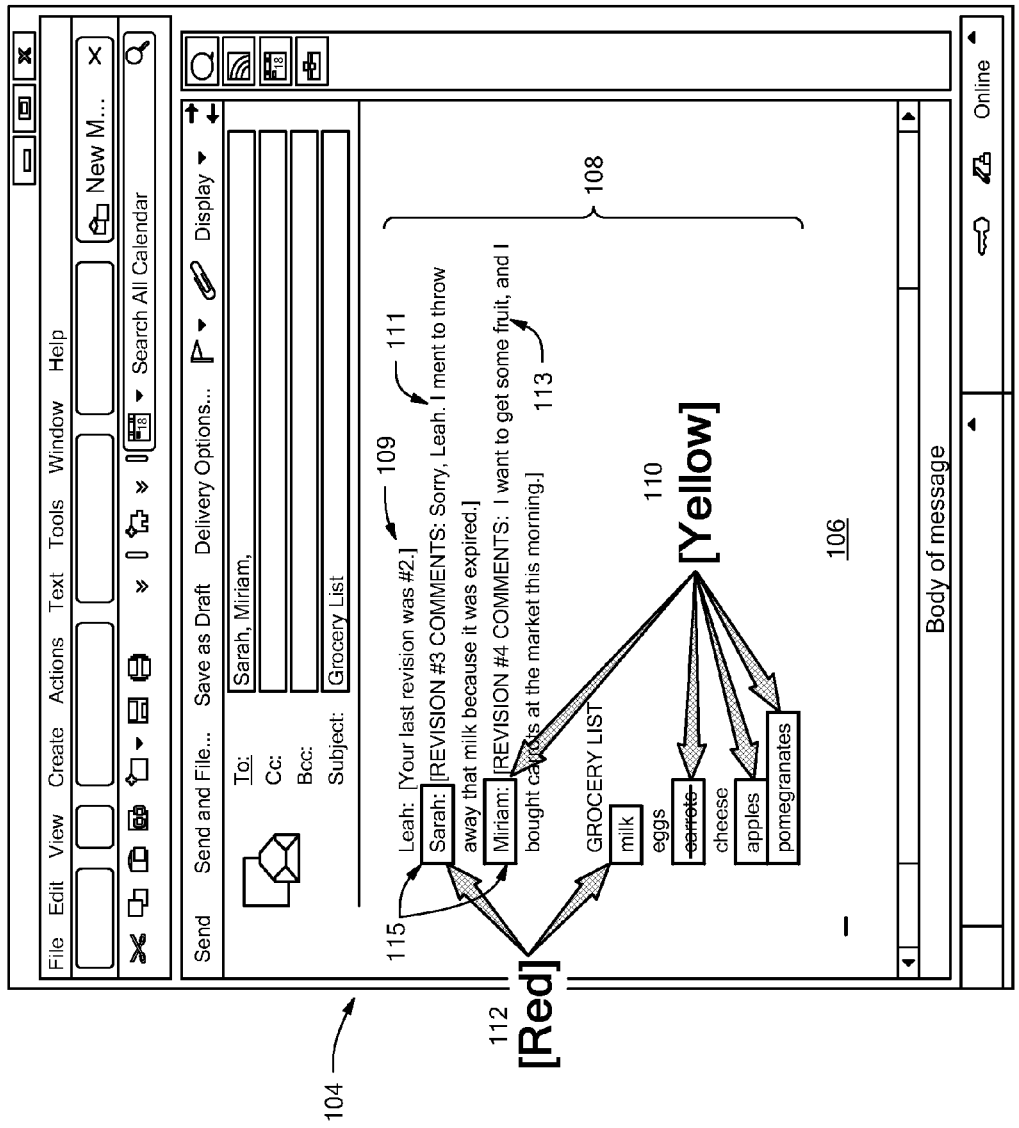
FIG. 8 is a simplified screen shot showing a second example of a received e-mail message user interface display object generated during operation of an illustrative embodiment of the disclosed system.

FIG. 8 is a simplified screen shot showing a second example of a Received E-mail Message User Interface Object 104 (another example of the Received E-mail Message User Interface Object 18 of FIG. 1). In the example of FIG. 8, the recipient of the original message (Leah) has viewed the revision #4 of FIG. 7 that includes all the changes made in both revision #3 from Sarah and revision #3 from Miriam. Leah has also clicked on or otherwise selected a user interface option (e.g. button, menu item, etc.) that causes the disclosed system to display details regarding all changes made in all revisions received since Leah's most recent revision (i.e. revision #2 shown in FIG. 4). Accordingly, the Message Reading Area 106 includes Detailed Message Contents 108 showing the specific changes made in the revisions received since Leah's most recent revision (i.e. added text highlighted, deleted text struck-through), an indication 109 of the last revision made by Leah ("Your last revision was #2"), and comments for each of the revisions merged together (i.e. "Sorry, Leah. I meant to throw away that milk because it was expired." for revision #3 of Sarah, and "I want to get some fruit, and I bought carrots at the market this morning." for revision #3 of Miriam), indications 115 of the authors of the revisions that were merged together (i.e. "Sarah" and "Miriam"). Color coding is used in the illustrative embodiment of FIG. 8 to identify which changes were made in which of the merged revisions. According, a first color 112 (i.e. red) is used to represent the name of the author of a first one of the merged revisions (i.e. "Sarah"), and also the change made in that revision (i.e. the highlighted entry "milk"). A second color 110 (i.e. yellow) is used to represent the name of the author of a second one of the merged revisions (i.e. "Miriam"), and also the changes made in that revision (i.e. the highlighted entries "apples" and "pomegranates", and the struck-through entry "carrots").

Figure 9:
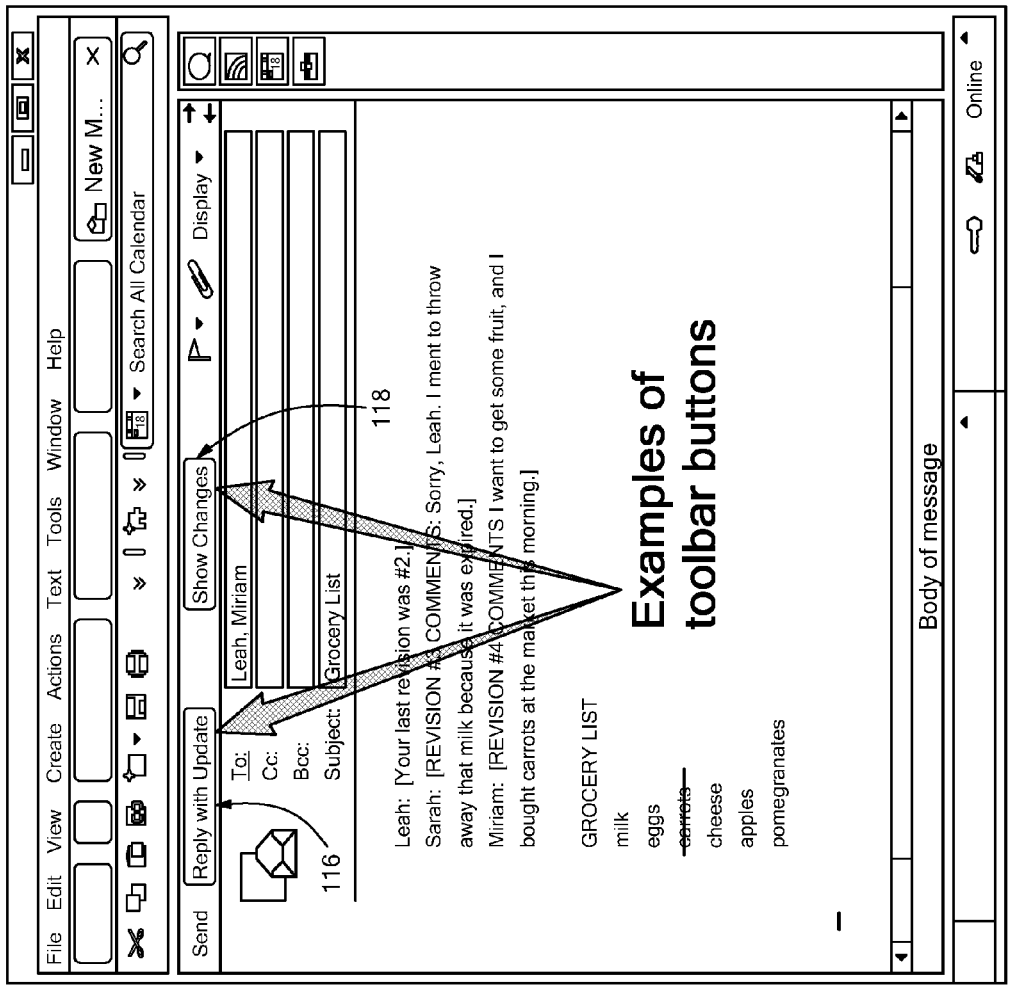
FIG. 9 is a simplified screen shot showing a third example of a received e-mail message user interface display object generated during operation of an illustrative embodiment of the disclosed system.

FIG. 9 is a simplified screen shot showing a third example of a Received E-mail Message User Interface Object 114 (another example of the Received E-mail Message User Interface Object 18 of FIG. 1). In the illustrative embodiment of FIG. 9, examples of user selectable options are shown as toolbar buttons. A "Reply with Update" button 116 is provided for the user to initiate generation of a revision to a received message. If the user clicks on the "Reply with Update" button 116, the disclosed system generates the "Reply With Update E-Mail Message Composition User Interface Object 20 shown in FIG. 1. A "Show Changes" button is provided for the user to cause the disclosed system to display the details of the changes within or more revisions to an original message received since a previous revision created or viewed by the user (e.g. Detailed Message Contents 108 of FIG. 8).

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:
1. A method comprising:
generating a received message user interface display object for a local user to read an original received electronic mail message, wherein said received message user interface display object includes a first user selectable option;
responsive to detecting selection of said first user selectable option by said local user, generating a reply with update electronic mail message composition user interface display object, automatically loading a contents of a message body of said original received message into a message editing area of said update electronic mail message composition user interface display object, detecting user editing operations performed on said contents of said message body of said original received message to create a first revision of said contents of said message body of said original received message, storing said user editing operations, detecting user entry of a comment into a user comment field within said update electronic mail message composition user interface display object, storing said comment, and generating and displaying a first revision number in said update electronic mail message composition user interface display object;
sending a first revision of said original received message having a message body including said revision of said contents of said message body of said original received message, said user editing operations, said comment and said revision number to a plurality of recipient users;

receiving, subsequent to said sending of said first revision of said original received message, from said recipient users a plurality of subsequent revisions of said original received message;

merging changes to said message body of said original received message contained in said plurality of subsequent revisions of said original received message such that all said changes to said message body of said original received message in said plurality of subsequent revisions of said original received message are simultaneously displayed in a single user interface display object;

wherein said received message user interface display object includes a second user selectable option; and responsive to detecting selection of said second user selectable option by said local user, generating a detailed view in which all said changes to said message body of said original received message in said plurality of subsequent revisions of said original received message are simultaneously displayed in a single user interface display object, wherein said detailed view includes indication of each change to said message body of said original received message in said plurality of subsequent revisions of said original received message, wherein said indication of each change includes indication of each string of added text and each string of deleted text, and wherein said detailed view further includes, for each specific change to said message body of said original message contained in said plurality of subsequent revisions and merged into said detailed view, an indication of which one of said recipient users made said change.

2. The method of claim 1, further comprising:

responsive to determining that a change to said message body of said original received message in a subsequent revision of said original received message cannot be automatically merged with a change to said message body of said original received message in said first revision of said original received message, generating an alert message to an author user of said subsequent revision of said original received message and enabling said author user of said subsequent revision of said original received message to manually edit said change to said message body of said original received message in said subsequent revision and said change to said message body of said original received message in said first revision of said original received message.

3. The method of claim 2, wherein said determining that said change to said message body of said original received message in said subsequent revision of said original received message cannot be automatically merged with said change to said message body of said original received message in said first revision of said original received message comprises determining that said change to said message body of said original received message in said subsequent revision of said original received message and said change to said message body of said original received message in said first revision of said original received message both modify the same line of text in said message body of said original received message.

4. The method of claim 1, wherein said detailed view further includes a comment associated with each of said plurality of subsequent revisions of said original received message.

5. The method of claim 1, wherein said first revision number comprises a first one of a series of sequential numeric values.

6. The method of claim 1, further comprising:

wherein said first revision number comprises a first one of a series of sequential numeric values; and wherein generating each of said plurality of subsequent revisions of said original received message includes generating a next one of said series of sequential numeric values by incrementing a revision number of a received previous revision.

7. A system comprising:

at least one processor;

computer readable memory accessible by said at least one processor, said memory having stored thereon program code executable on said at least one processor, said program code including program code for generating a received message user interface display object for a local user to read an original received electronic mail message, wherein said received message user interface display object includes a first user selectable option, program code for, responsive to detecting selection of said first user selectable option by said local user, generating a reply with update electronic mail message composition user interface display object, automatically loading a contents of a message body of said original received message into a message editing area of said update electronic mail message composition user interface display object, detecting user editing operations performed on said contents of said message body of said original received message to create a first revision of said contents of said message body of said original received message, storing said user editing operations, detecting user entry of a comment into a user comment field within said update electronic mail message composition user interface display object, storing said comment, and generating and displaying a first revision number in said update electronic mail message composition user interface display object, and program code for sending a first revision of said original received message having a message body including said revision of said contents of said message body of said original received message, said user editing operations, said comment and said revision number to a plurality of recipient users, program code for receiving, subsequent to said sending of said first revision of said original received message, from said recipient users a plurality of subsequent revisions of said original received message, program code for merging changes to said message body of said original received message contained in said plurality of subsequent revisions of said original received message such that all said changes to said message body of said original received message in said plurality of subsequent revisions of said original received message are simultaneously displayed in a single user interface display object, wherein said received message user interface display object includes a second user selectable option, and program code for, responsive to detecting selection of said second user selectable option by said local user, generating a detailed view in which all said changes to said message body of said original received message in said plurality of subsequent revisions of said original received message are simultaneously displayed in a single user interface display object, wherein said detailed view includes indication of each change to said message body of said original received message in said plurality of subsequent revisions of said original received message, wherein said indication of each change includes indication of each string of added text and each string of deleted text, and wherein said detailed view further includes, for each specific change to said message body of said original message contained in said plurality of subsequent revisions and merged into said detailed view, an indication of which one of said recipient users made said change.

8. The system of claim 7, said program code further comprising:
program code for, responsive to determining that a change to said message body of said original received message in a subsequent revision of said original received message cannot be automatically merged with a change to said message body of said original received message in said first revision of said original received message, generating an alert message to an author user of said subsequent revision of said original received message and enabling said author user of said subsequent revision of said original received message to manually edit said change to said message body of said original received message in said subsequent revision and said change to said message body of said original received message in said first revision of said original received message.

9. The system of claim 7, wherein said detailed view further includes a comment associated with each of said plurality of subsequent revisions of said original received message.

10. The system of claim 7, wherein said first revision number comprises a first one of a series of sequential numeric values.

11. The system of claim 7, further comprising:
wherein said first revision number comprises a first one of a series of sequential numeric values; and
wherein generating each of said plurality of subsequent revisions of said original received message includes generating a next one of said series of sequential numeric values by incrementing a revision number of a received previous revision.

12. A computer program product comprising:
a non-transitory computer readable medium having program code stored thereon including
program code for generating a received message user interface display object for a local user to read an original received electronic mail message, wherein said received message user interface display object includes a first user selectable option,
program code for, responsive to detecting selection of said first user selectable option by said local user, generating a reply with update electronic mail message composition user interface display object, automatically loading a contents of a message body of said original received message into a message editing area of said update electronic mail message composition user interface display object, detecting user editing operations performed on said contents of said message body of said original received message to create a first revision of said contents of said message body of said original received message, storing said user editing operations, detecting user entry of a comment into a user comment field within said update electronic mail message composition user interface display object, storing said comment, and generating and displaying a first revision number in said update electronic mail message composition user interface display object,
program code for sending a first revision of said original received message having a message body including said revision of said contents of said message body of said original received message, said user editing operations, said comment and said revision number to a plurality of recipient users,
program code for receiving, subsequent to said sending of said first revision of said original received message, from said recipient users a plurality of subsequent revisions of said original received message,
program code for merging changes to said message body of said original received message contained in said plurality of subsequent revisions of said original received message such that all said changes to said message body of said original received message in said plurality of subsequent revisions of said original received message are simultaneously displayed in a single user interface display object,
wherein said received message user interface display object includes a second user selectable option, and
program code for, responsive to detecting selection of said second user selectable option by said local user, generating a detailed view in which all said changes to said message body of said original received message in said plurality of subsequent revisions of said original received message are simultaneously displayed in a single user interface display object, wherein said detailed view includes indication of each change to said message body of said original received message in said plurality of subsequent revisions of said original received message, wherein said indication of each change includes indication of each string of added text and each string of deleted text, and wherein said detailed view further includes, for each specific change to said message body of said original message contained in said plurality of subsequent revisions and merged into said detailed view, an indication of which one of said recipient users made said change.

* * * * *